Jan. 11, 1944. J. C. ARNOLD 2,338,991
MAGNETIC WELL LOGGING
Filed Oct. 19, 1940 2 Sheets-Sheet 1

INVENTOR
JAMES C. ARNOLD
BY Lloyd Spencer
ATTORNEY

Jan. 11, 1944.    J. C. ARNOLD    2,338,991
MAGNETIC WELL LOGGING
Filed Oct. 19, 1940    2 Sheets-Sheet 2
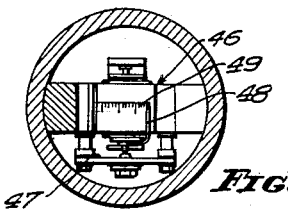
FIG. 6
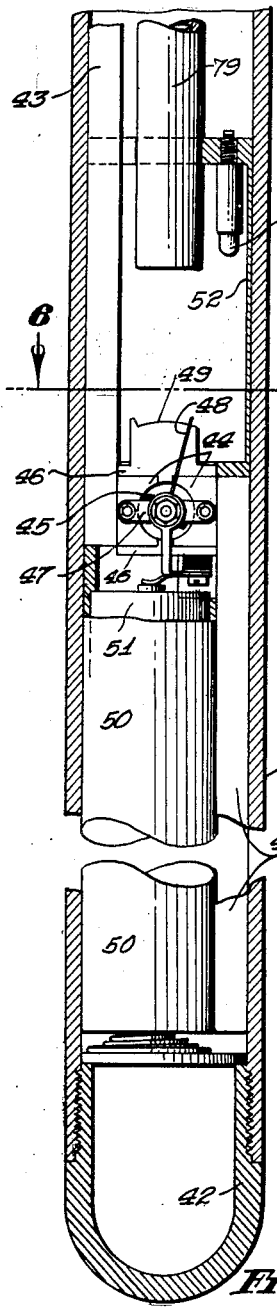
FIG. 5
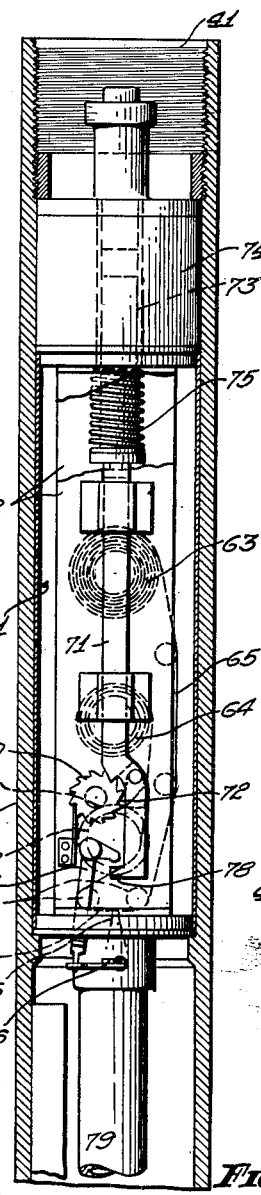
FIG. 7
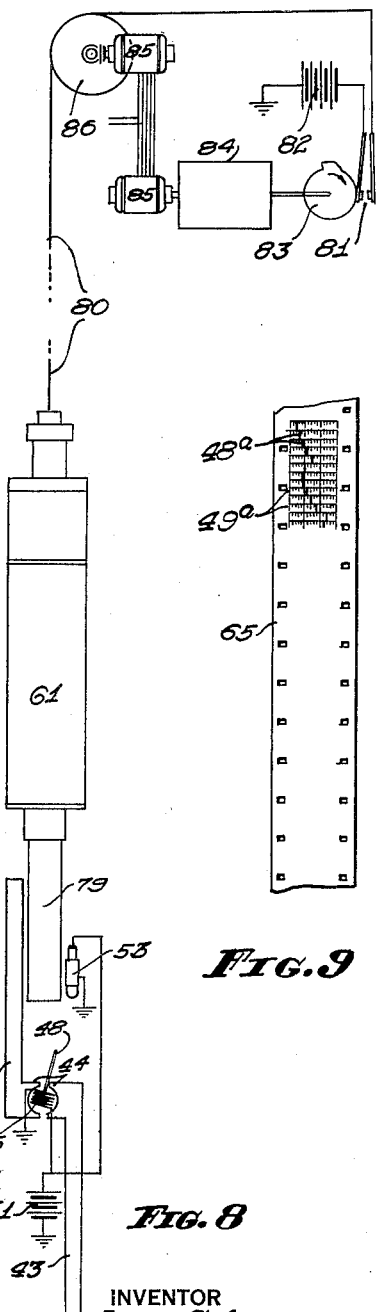
FIG. 9
FIG. 8
INVENTOR
JAMES C. ARNOLD
BY Lloyd Spencer
ATTORNEY Patented Jan. 11, 1944

2,338,991

UNITED STATES PATENT OFFICE 2,338,991

MAGNETIC WELL LOGGING

James C. Arnold, Los Angeles, Calif., assignor to Lane-Wells Company, Los Angeles, Calif., a corporation of Delaware Application October 19, 1940, Serial No. 361,947

4 Claims. (Cl. 175—182)

My invention relates to magnetic well logging for the purpose of identifying formation confronting a well bore by its magnetic properties. During the process of sedimentation of the various strata which are penetrated by an oil well bore, magnetic particles contained in the strata tend to orient themselves with respect to the magnetic field of the earth. The direction and intensity of the earth's magnetic field through the ages has varied through extreme ranges. Sedimentation of the various strata has occurred at intervals of many million years, so that the magnetic axes of the various strata have varied accordingly. Also the amount of iron or other magnetic material within the strata differs and the various formations tend to influence or affect the now existing earth's magnetic field. All of these factors tend to introduce anomalies and variations in the magnetic properties of the formation confronting a well bore. By detecting and correlating records taken from different wells in a given field it is possible to identify various formations. Accordingly, among the objects of my invention are:

First, to provide, in general, a method and apparatus for recording anomalies or variations in the magnetic properties of formations confronting a well bore;

Second, to provide a method and apparatus of this character which is influenced to a minimum extent by the azimuthal direction of the earth's magnetic field so that the instrument may rotate considerably during its movement through the well bore without influencing its operation;

Third, to provide a method and means of this character whereby the magnetic forces being measured are concentrated so as to increase the effect of the magnetic field upon the instrument;

Fourth, to provide a method and apparatus of this character which produces a graphic record of the magnetic anomalies, which record is plotted in terms of well depth so that the record may be compared or used in conjunction with electrical log records or other well surveys;

Fifth, to provide an apparatus of this character which, in its one form, may be lowered on a single conductor cable;

Sixth, to provide an apparatus of this character in which the record is made within the instrument itself, thereby eliminating the need of complicated surface-recording apparatus or transmission means with the attendant difficulties of producing a record which is free of spurious indications introduced when attempting to transmit the signals obtained;

Seventh, to provide an apparatus which, in its one form, employs a magnetizable wire which is advanced through the instrument in proportion to the movement of the instrument in the well bore, so that the wire itself contains the record of the magnetic anomalies encountered and may be at any subsequent time decoded by running the wire through a suitable decoding machine and recording apparatus; and Eighth, to provide another form of apparatus which produces a record within the instrument on photographic film, which film may serve directly as a record chart.

With the above and other objects in view, as may appear hereinafter, reference is directed to the drawings, in which:

Figure 1 is a partial elevational, partial diagrammatical view of my apparatus, the form which employs a magnetizable wire;

Figure 2 is an enlarged, longitudinal, fragmentary sectional view of the upper portion of the apparatus, viewed in the same direction as Figure 1;

Figure 3 is a similar longitudinal sectional view of the lower portion of the apparatus, continuing from Figure 2 and likewise viewed in the same direction as Figure 1; and Figure 4 is a diagrammatical view of the decoding apparatus for translating the record made on the magnetic wire to a record chart.

Figures 5 through 9 illustrate a modified form of my apparatus in which the record is made photographically:

Figure 5 is a longitudinal sectional view of the lower portion of the apparatus;

Figure 6 is a transverse sectional view taken through 6—6 of Figure 5;

Figure 7 is a continuation of Figure 5;

Figure 8 is a diagrammatical view of the apparatus; and

Figure 9 is a representation of a typical record obtained from the modified apparatus.

Figures 1, 2, 3, 4:
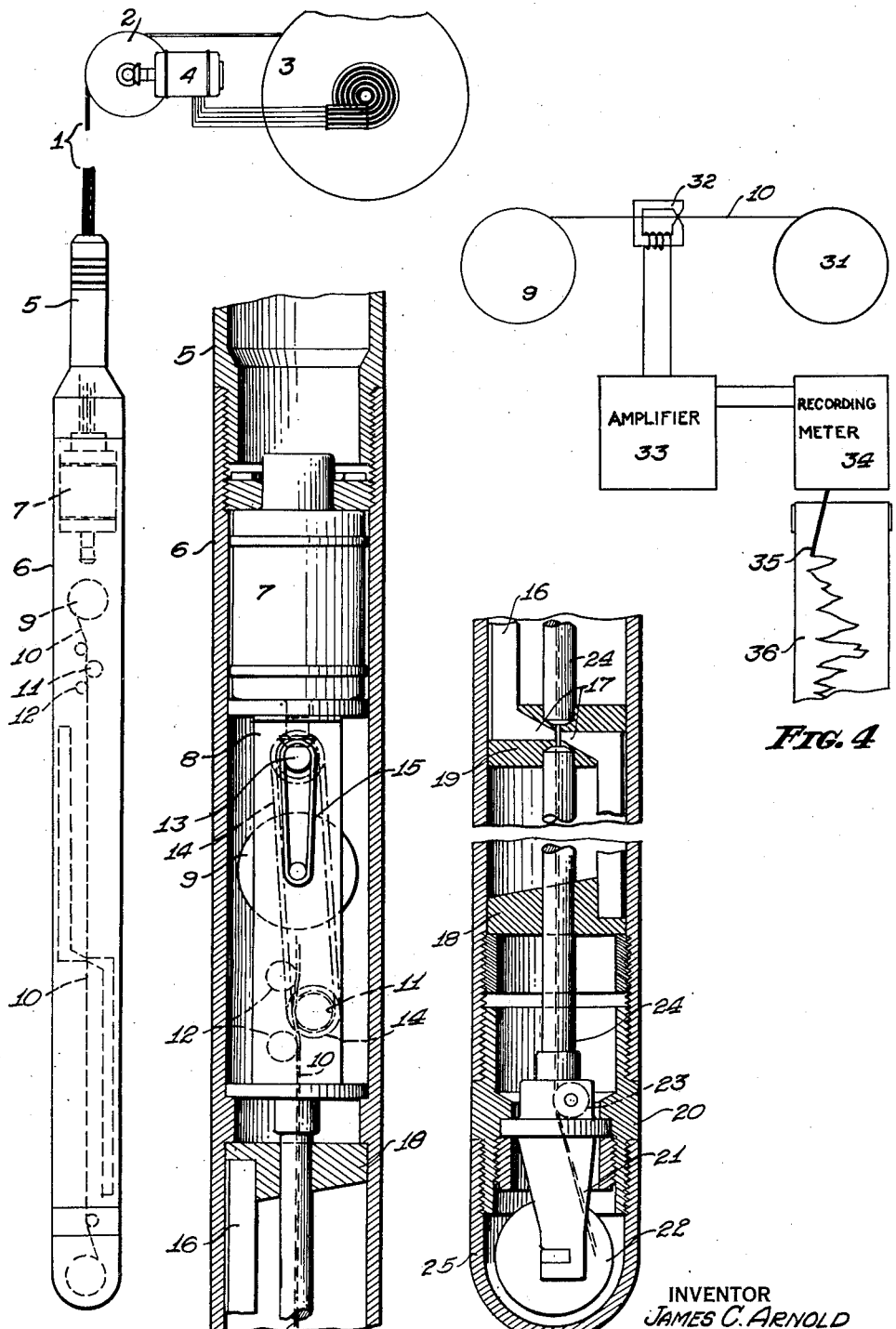
Figures 1 through 4 illustrate one form of my invention.

Reference is first directed to Figures 1 through 4: In the structure here shown the instrument is lowered on a cable 1, preferably carrying five conductors. The cable passes around a sheave 2 and winds upon a hoist drum 3. The conductors of the cable are connected to a motor unit 4 driven from the sheave 3. This type of motor unit is commercially known as a Selsyn motor unit and is adapted to cause synchronous movement of a like unit. The lower end of the cable 1 is provided with a cable head 5 which is joined to a tubular case 6

In the upper end of the case 6 there is mounted a motor unit 7 which is a companion to the motor unit 4. A frame structure 8 is provided below the motor unit 7 which supports a spool 9 adapted to receive a magnetizable wire 10. Below the spool 9 the magnetizable wire extends over a feeding wheel 11 and is held thereon by idler wheels 12. A cross shaft 13 is provided at the upper end of the frame 8 and is driven by beveled gears from the motor unit 7. The cross shaft is connected by sprocket and chain means 14 to the wheel 11 and by suitable friction drive means 15 to the spool 9.

Below the framework 8 the case 6 is provided with a pair of concentrating bars 16. The bars extend longitudinally along diametrically opposite sides of the case and overlap only slightly at their adjacent ends. At their overlapping ends they are provided with inturned pole pieces 17. The pole pieces terminate in close proximity to each other and the magnetizable wire 10 is adapted to pass therebetween. The concentrating bars 16 are formed of material having high magnetic permeability such as a material known commercially as "Permalloy" and, in order to facilitate mounting within the case 6 they may have at their extended ends die-cast discs 18 and at their central or overlapping ends the pole pieces may be molded or die-cast within a central disc 19, the discs 18 and 19, of course, being formed of non-magnetic material such as zinc or the like. The lower end of the case receives a fitting 20 which carries a spool support 21 in the form of a yoke. A spool 22 is mounted in the spool support and magnetizable wire from the spool is adapted to pass over an idler wheel 23 carried by the support.

The support 21 and frame 8 may be provided with guide tubes 24 which may extend through the end discs 18 into sockets formed in the central disc 19 which register with a hole in the disc to accommodate the magnetizable wire. Thus the wire may be readily threaded from the spool 22 upwardly through the guide tubes to the receiving spool 9. A cap 25 fits over the lower end of the fitting 20 to enclose the spool 22.

Operation of my apparatus as shown in Figures 1, 2 and 3, is as follows: The instrument is moved along a well-bore and the motors are caused to operate in synchronism so that for every foot of travel of the apparatus, a corresponding length of wire is fed past the pole pieces. The magnetizable wire may be extremely small and, consequently, a large quantity, in fact, several thousand feet, may be wound on spools of quite small diameter. Thus it is possible that the record bear a direct ratio to the depth of well being surveyed, that is, the magnetizable wire being caused to move upwardly at the same rate the instrument is lowered so that there is a one to one ration. Actually, however, a few inches of wire may represent a hundred feet of well-bore; this may be accomplished by simply moving the wire at a slower speed.

In this connection, it should be noted that it is not necessary for the wire to move continuously, but it may be moved in steps; that is, a series of records taken at different points along the well-bore may be made instead of a continuous record, in which case the magnetic wire would be caused to advance in steps much in the manner of the film-controlled mechanism to be described hereinafter.

After the record has been impressed upon the wire and the instrument removed from the well-bore the wire is unwound from the spool 9 onto another spool 31, and caused to pass through a pick-up unit 32. The pick-up unit is electrically connected through an amplifier 33 to a recording meter 34, which is provided with a stylus or similar recording element 35 adapted to move in accordance with the change in magnetic intensity on the wire and record the same on a moving chart 36, all as shown diagrammatically in Figure 4. If the wire has been caused to advance step by step, rather than continuously, the decoding or translating apparatus shown in Figure 4 would likewise be provided with means for step-by-step movement of the wire.

Reference is now directed to Figures 5 through 8: In this construction the apparatus is contained in a tubular case 41 covered at its lower end by a cap 42. Within the case are secured a pair of concentrating bars 43 arranged as in the first described structure with one bar extending upwardly and the other downwardly, and on diametrically opposite sides of the case, the adjacent ends of the concentrating bars overlapping slightly and being provided with pole pieces 44. The pole pieces are similar to those used in milliammeters, in that they define a cylindrical opening in which is mounted a meter coil 45. The pole pieces are encased in a suitable molded body 46 of non-magnetic material. The body 46 carries a framework 47 which supports the meter coil 45. Extending from the meter coil 45 is a pointer 48 which is directed upward. The axis of the coil is at right angles to the axis of the case 41 so that the pointer extends longitudinally and its upper end is bent horizontally over a scale 49 which may be formed on a part of the molded body 46 at its upper end.

Along the side of the lower concentrating bar 43 is a battery compartment 50 containing batteries 51. Above the pole pieces 44 there is supported a frame 52 which carries a series of electric lights 53 connected with the battery for the purpose of illuminating the scale and pointer. The meter coil 45 is likewise connected with the batteries.

Within the case above the upper concentrating bar 43 is mounted a camera mechanism 61. The camera mechanism comprises a frame 62 which supports film reels 63 and 64 between which is adapted to pass a photographic film 65. The film passes from the upper reel down along one side of the frame and across the lower end, that is, across the aperture 66, being held in proper position by guide rollers 67. After passing around the guide rollers the film is directed upwardly around a drive wheel 68 to the reel 64. The drive wheel 68 is actuated by a gear train 69 which in turn is actuated by a drive ratchet 70. The ratchet 70 is operated by a bar 71 which is mounted along the side of the frame 62. The bar is adapted to reciprocate and is provided with a pawl 72. The operating bar 71 extends to the upper end of the frame 62 and is attached to an armature 73, which cooperates with a solenoid 74. The armature causes upward movement of the operating arm while a spring 75 urges the arm downwardly. The ratchet and pawl are so arranged that the film does not advance during upward movement of the operating bar, but only with downward movement of the bar. Below the aperture 66 there is provided a suitable shutter 76 which is actuated by a lever 77 extending upwardly along the side of the frame and positioned so as to be engaged by a lug 78 extending from the operating bar 71. The shutter is caused to operate during upward movement of the operating bar, so that with each operation of the bar the shutter is operated and then the film is moved into a new position. Extending from the camera mechanism is a sighting tube 79 containing a suitable lens system and terminating in proximity to the scale 49 so that the scale and pointer may be photographed. The camera mechanism is so positioned that the pointer 48 moves crosswise with respect to the film, and only a very narrow strip of film need be provided for each record, as shown in Figure 9 in which 49a represents the photograph of scale 49 and 48a represents the photograph of the pointer 48.

The solenoid is electrically connected through a single conductor cable 80 to a switch 81 and battery 82. The switch 81 is cam-actuated periodically by a cam wheel 83 which is driven by a transmission 84 suitably driven, as by a Selsyn drive 85, from a sheave wheel 86, over which the cable passes. Thus the camera mechanism is caused to take a picture and move the film for each predetermined length of cable travel; for example, a picture may be taken, one each foot, or each two feet, or five feet, depending upon the detail it is desired to obtain in the record.

Operation of the apparatus shown in Figures 5 to 9 is as follows: The instrument is preferably moved at a uniform rate and the meter, represented by the coil and pointer, is preferably dampened in any conventional manner so that ordinary shaking of the instrument will not unduly affect the meter. In an instrument no larger than the drawing, as actually shown, several hundred inches of film may be carried and the records may be placed as close as twenty-five to the inch, thus if the records are made at two-foot intervals some five thousand feet of well bore may be recorded. Of course, it is not necessary to investigate the entire well, but only that portion in which it is likely that oil may be found.

In both constructions the concentrating bars are formed of highly permeable material and have the effect of concentrating the magnetic field embraced between the extremities of the bars at the meter or the gap through which the magnetic wire passes. The dip of the magnetic field, however, has an effect that may be largely compensated for or discounted for the reason that, normally, the dip of the earth's magnetic field is substantially constant, assuming, of course, that the well is straight. Inasmuch as the present practice is to drill a well within rather close tolerances, in most instances no appreciable error will arise by reason of change in the angle of the well bore. Furthermore, should it be desired to investigate a well bore that is not straight, a survey of the well bore may be made to determine its course and such a record be used to determine the correction factors that should be applied to the record obtained by my apparatus.

The longer the concentrating bars the stronger will be the effect; however, this effect will be the average of the magnetic field between the extremities of the concentrating bars. Consequently, the length of the concentrating bars should be less than the probable minimum thickness of the strata to be investigated.

Various changes and alternate arrangements may be made within the scope of the appended claims, in which it is my intention to claim all novelty inherent in the invention as broadly as the prior art permits.

I claim:

1. A method of identifying formation confronting a well bore, characterized by: concentrating the magnetic field present in predetermined sections of a well bore upon corresponding sections of a magnetizable wire; removing the wire from the well bore; and recording the variations in magnetic condition of said wire along its length.

2. An apparatus for investigating a well bore, comprising: a magnetizable wire; a case therefor adapted to be lowered into a well bore; reels for said wire in said case; means for advancing said wire from one reel to the other; a control for said means coordinated with movement of said case through a well bore; and means for concentrating the magnetic field in the well bore on said wire, whereby a magnetic impression of said field is formed thereon.

3. The combination with the apparatus set forth in claim 2 of a recording means including a pick-up unit adapted, when moved along said wire, to detect the magnetic impressions thereon.

4. An apparatus for logging well bores, comprising: a housing adapted to be lowered into a well bore; highly permeable elements arranged longitudinally therein; coacting pole pieces associated with said permeable elements and defining therebetween a gap, the permeable elements and pole pieces being so arranged that the magnetic field embraced by said elements is concentrated across said gap; a magnetizable wire in said gap; means for moving the wire past the pole pieces; means for moving said housing along a well bore; and a device for correlating the movements of said means.

JAMES C. ARNOLD.